United States Patent
Yu

(10) Patent No.: US 8,644,626 B2
(45) Date of Patent: Feb. 4, 2014

(54) METHOD FOR STORING AND PROCESSING IMAGE SEQUENCE AND METHOD FOR COMPRESSING, STORING AND PROCESSING IMAGE SEQUENCE

(75) Inventor: Peining Yu, Beijing (CN)

(73) Assignee: Intellesys Co., Ltd., Beijing (CN)

( * ) Notice: Subject to any disclaimer, the term of this patent is extended or adjusted under 35 U.S.C. 154(b) by 48 days.

(21) Appl. No.: 13/516,403

(22) PCT Filed: Dec. 17, 2010

(86) PCT No.: PCT/CN2010/079968
§ 371 (c)(1),
(2), (4) Date: Jun. 15, 2012

(87) PCT Pub. No.: WO2011/072620
PCT Pub. Date: Jun. 23, 2011

(65) Prior Publication Data
US 2012/0257836 A1 Oct. 11, 2012

(30) Foreign Application Priority Data

Dec. 17, 2009 (CN) .......................... 2009 1 0242521
Apr. 30, 2010 (CN) .......................... 2010 1 0160818

(51) Int. Cl.
*G06K 9/46* (2006.01)

(52) U.S. Cl.
USPC ........... 382/232; 382/235; 382/243; 382/305; 358/539; 358/426.05; 358/426.14

(58) Field of Classification Search
USPC ......... 382/232, 235, 243, 244, 278, 282, 305; 358/538, 539, 426.05, 426.14
See application file for complete search history.

(56) References Cited

U.S. PATENT DOCUMENTS

| 7,131,048 B2 * | 10/2006 | Suzuki et al. ................. 714/748 |
| 7,294,446 B2 * | 11/2007 | Spoonhower et al. ........ 430/269 |
| 7,336,720 B2 * | 2/2008 | Martemyanov et al. . 375/240.12 |
| 8,175,383 B2 * | 5/2012 | Shiraishi ...................... 382/167 |
| 8,189,941 B2 | 5/2012 | Miyasaka |
| 8,463,035 B2 * | 6/2013 | Bechtel et al. ................ 382/167 |

FOREIGN PATENT DOCUMENTS

| CN | 1949831 A | 4/2007 |
| CN | 101317195 A | 12/2008 |
| CN | 101729840 A | 6/2010 |

* cited by examiner

*Primary Examiner* — Yosef Kassa
(74) *Attorney, Agent, or Firm* — Blakely Sokoloff Taylor & Zafman LLP

(57) ABSTRACT

The present invention relates to a method for storing an image sequence and a method for compressing, storing an image sequence. The method for storing an image sequence comprises the following steps: within the image sequence, forming a pixel-bit sequence according to known positions and order of each pixel in each of image frames formed by pixels; within the image sequence, setting a pixel value of a first pixel-bit position of a preceding image frame as a "preceding pixel value", while setting the pixel value of the same pixel-bit position of the succeeding image frame adjacent to the said preceding image frame as a "succeeding pixel value", comparing the said "preceding pixel value" with the said "succeeding pixel value"; creating a recording program to record a number of times of consecutively repeated presence of the "preceding pixel value" in the pixel-bit position. The present invention can decrease the data storage amount of the image when the image is processed and stored by statistically recording the repeated data content.

14 Claims, 9 Drawing Sheets

METHOD FOR STORING AND PROCESSING IMAGE SEQUENCE AND METHOD FOR COMPRESSING, STORING AND PROCESSING IMAGE SEQUENCE

This application is a national phase application of international patent application No. PCT/CN2010/079968, which claims the priority of Chinese patent application Nos. 200910242521.7 filed Dec. 17, 2009, and 201010160818.1 filed Apr. 30, 2010. The disclosure of the above applications is incorporated by reference herein in its entirety.

TECHNICAL FIELD

The present invention mainly relates to, but is not limited to, digital image processing technology for such as visible light image sequence, infrared image sequence, ultraviolet image sequence, laser image sequence, radar image sequence, and sonar image sequence, especially relates to a method for storing digital images and a method for compressing, and storing an image sequence.

BACKGROUND

At present, a known digital image lossless storage method mainly processes and stores all the pixels of all frames of the digital image completely without any omission. The major drawback of this method is its resulting huge stored information on the digital image and longer storing time. Moreover, since the bulk data of the stored digital image is so large, that is to say, the number of bytes of the storage file created to store a digital image is so big that it takes so long to transmit, read and display them; therefore, the said method has a low efficiency.

Since digital image processing mostly relates to two-dimensional information, it is inevitable to process a large number of information. For example, a black-and-white digital image with a low resolution 256×256 requires approximately 64 kbit data amount, whereas a color digital image with a high resolution 512×512 requires approximately 768 kbit data amount. If a video digital image sequence at 30 frame/second is processed, then it requires 500 kbit~22.5 Mbit data amount. Therefore, digital image processing has a higher requirement for computing speed and storage capacity of a computer.

In addition, digital image processing usually occupies a wider frequency bandwidth that is a few orders of magnitude greater than the frequency band voice processing occupies. For instance, video digital images usually occupy a bandwidth of about 5.6 MHz, whereas voice only occupies a bandwidth of about 4 kHz. Therefore, it is difficult on technology and costly to implement imaging, transmitting, processing, storing, and displaying and other processing for the digital image, which thus leads to a higher demand for frequency band compression technique.

Pixel content or pixel values of all pixels of a digital image usually are highly correlated to each other. Taking a video image frame as an example, the correlation coefficient of two successive pixels in the same row or the pixels between two successive rows can reach up to above 0.9, and the correlation of the image contents of two successive image frames is generally much higher than the intra-frame correlation, which makes it possible to compress the image information by digital image processing technology. A known digital image lossless compression methods include Shannon-Fano encoding method, Huffman encoding method, Run-length encoding method, Lempel-Ziv-Welch (LZW) encoding and arithmetic encoding method, and so on. These methods mainly use statistical data redundancy to compress data, and can make original data recover without any distortion, but the statistical data redundancy limits the compression ratio of the data. Moreover, temporal redundancy (or "time-domain redundancy") exists between the pixels of different image frames in an image sequence. When this type of the temporal redundancy is lossless compressed, it will create a large number of data and thus lead to a huge storage expense due to recording the movement vector of the pixels.

SUMMARY OF THE INVENTION

The present invention provides a method of storing the image sequence to reduce data volume and process time of storing data, while improving processing efficiencies, comprising:

In order to solve the above technical problems, the present invention, in combination with the embodiments provided, discloses the following technical solution:

A method for storing an image sequence, comparing the following steps:

Within the image sequence, forming a pixel-bit sequence according to known positions and order of each pixel in each of image frames formed by pixels;

Within the image sequence, setting a pixel value of a first pixel-bit position of a preceding image frame as a "preceding pixel value", while setting the pixel value of the same pixel-bit position of the succeeding image frame adjacent to the said preceding image frame as a "succeeding pixel value", comparing the said "preceding pixel value" with the said "succeeding pixel value";

Creating a recording program to record a number of times of consecutively repeated presence of the "preceding pixel value" in the pixel-bit position;

Wherein, comparing the said "preceding pixel value" with the said "succeeding pixel value", and proceeding as follows:

Step S1: by comparing, if the absolute value of the difference between the said "preceding pixel value" and the said "succeeding pixel value" equals to zero or is less than a preset threshold, the said "preceding pixel value" shall be deemed to be equal to the said "succeeding pixel value", and hereafter the following steps are proceeded:

Recording and/or storing the said "preceding pixel value";

The recording program updating, recording, and/or storing the number of times of consecutively repeated presence of the "preceding pixel value" in the said pixel-bit position in the image sequence;

When there is a subsequent image frame to be processed within the said image sequence, the said "preceding pixel value" remains as the "preceding pixel value" to continuously compare cyclically with a new "succeeding pixel value" that is the pixel value of the same pixel-bit position of a subsequent image frame adjacent to the said "succeeding image frame;

Step S2: by comparing, if the absolute value of the difference between the said "preceding pixel value" and the said "succeeding pixel value" is greater than the preset threshold, proceeding to the following steps:

Recording and/or storing the said "preceding pixel value";

The recording program updating, recording, and/or storing the number of times of consecutively repeated presence of the "preceding pixel value" in the said pixel-bit position in the image sequence;

Recording and/or storing the said "succeeding pixel value";

The recording program updating, recording, and/or storing the number of times of consecutively repeated presence of the "succeeding pixel value" in the said pixel-bit position in the image sequence;

When there is a subsequent image frame to be processed within the said image sequence, the said "succeeding pixel value" is set as a new "preceding pixel value" to cyclically compare with a new "succeeding pixel value" that is a pixel value of the same pixel-bit position of a subsequent image frame adjacent to the succeeding image frame.

Preferably, either Step S1 or Step S2 is selected to process the pixel values, when the absolute value of the difference between the "preceding pixel value" and the "succeeding pixel value" equals to the preset threshold.

Preferably, the first pixel-bit position of the preceding image frame is any of the pixel-bit positions in the preceding image frame.

Preferably, in one and the same image sequence, according to the known position of pixels in the image, the known pixel position adjacent to the first pixel-bit position is the second pixel-bit position. The pixel value of the second pixel-bit position of the preceding image frame is set as a "preceding pixel value", while the pixel value of the same pixel-bit position of the succeeding image frame adjacent to the said preceding image frame is set as a "succeeding pixel value", and then the said "preceding pixel value" is compared with the said "succeeding pixel value" in any order.

Preferably, in one and the same image sequence, the known pixel position adjacent to the second pixel-bit position is the third pixel-bit position. The pixel value of the third pixel-bit position of the preceding image frame is set as a "preceding pixel value", while the pixel value of the same pixel-bit position of the succeeding image frame adjacent to the said preceding image frame is set as a "succeeding pixel value", and then the said "preceding pixel value" is compared with the said "succeeding pixel value" in any order.

Preferably, in one and the same image sequence, the pixel value of each pixel-bit position of a preceding image frame is set as a "preceding pixel value" one by one, while the pixel value of each of the same pixel-bit positions of the succeeding image frame adjacent to the said preceding image frame is set as a "succeeding pixel value" one by one; and then within the two succeeding and preceding image frames, the "preceding pixel value" is compared separately with the "succeeding pixel value" positioned in each of the same pixel-bit positions, till all of the pixel values of the pixel-bit positions forming the images of the image sequence are processed by the similar way.

Preferably, the "preceding pixel value" of each pixel-bit position of each image frame of the image sequence is compared with the "succeeding pixel value" in the same pixel-bit position of the adjacent image frame.

Preferably, the comparison is made between the pixel values of each frame of the images which are set to be stored in the other subsequent image feature frame of the image sequence and/or between the pixel values in the pixel-bit positions of each frame of the images which are set to be stored in each frame of the images.

Preferably, the known positions and order in the image frame are arranged as follows: the first pixel-bit position, the second pixel-bit position, the third pixel-bit position . . . and up to the nth pixel-bit position respectively, and the position and order of each effective pixel of each image frame in the said image sequence are positioned and indicated by coordinates.

Preferably, the arrangement manner of the pixel-bit positions within the image frame, i.e. the first pixel-bit position, the second pixel-bit position, the third pixel-bit position . . . and up to the nth pixel-bit position, is set according to certain regular feature or the information of the pixel-bit positions which is obtained by encoding.

Preferably, the preceding image frame is any of the image frames in the image sequence.

Preferably, processing of the image sequence is started upon obtaining a preceding image frame and a succeeding image frame, and is continued until the subsequent image frame can be processed in real time and all image frames of the said image sequence are processed one by one Preferably, processing of the image sequence is started upon completion of collecting all the image frames of the said image sequence and is continued until all the image frames of the said image sequence are processed one by one, or the processing is started upon collecting a portion of the image frames of the said image sequence, and is continued until all the image frames of the said image sequence are processed one by one Preferably, the preset threshold is relevant to the pixel accuracy. For example, the preset threshold can be set as 3, 6 and 20 respectively when the pixel is 8 bit, 12 bit and 16 bit pixel.

Compared with the prior art, the method for storing an image sequence provided by the present invention has the following advantages:

Firstly, in the present invention, when temporal redundancy (or "time domain redundancy") of the pixel value of the pixel-bit position in the image sequence is stored, the image sequence is stored by statistically recording the repeated data content and by the use of the known position-bit position information of the pixels in relevant image frames, so as to decrease the data storage amount.

Secondly, as the image data amount to be stored is reduced effectively, the storage space for the image is reduced dramatically. Compared to lossless compressing and coding the sequence by recording the movement vector during storing, a lot of storage space can be saved. Since in the initial stage, the setting of the positions and order of all the pixels in digital images replaces lossless compressing and coding the sequence by recording the movement vector during storing, further the corresponding pixel-bit position of each pixel of each digital image frame is defined, and the pixels can be recovered according to their preset pixel-bit position, so that desirable effect can be achieved when the image is stored, transmitted, read and displayed.

On the other hand, the present invention provides a method for compressing and storing an image sequence, so as to solve such problem as huge storage expense, longer time spent for storing, the large storage space, and low efficiency due to recording the movement vector when temporal redundancy (or "time domain redundancy") of the pixel value of the pixel-bit position in the image sequence is processed and stored in the prior art.

In order to solve the above technical problems, the present invention, in combination with the embodiments provided, discloses the following technical solution:

A method for compressing and storing an image sequence, wherein, within the image sequence, forming a pixel-bit sequence according to known positions and order of each pixel in each of image frames formed by pixels;

within the image sequence, setting a pixel value of a first pixel-bit position of a preceding image frame as a "preceding pixel value", while setting the pixel value of the same pixel-bit position of the succeeding image frame adjacent to the said preceding image frame as a "succeeding pixel value", comparing the said "preceding pixel value" with the said "succeeding pixel value";

In the image sequence being processed, setting a pixel value of each pixel-bit position of a preceding image frame as a "preceding pixel value" one by one, while setting the pixel value of each of the same pixel-bit position of the succeeding image frame adjacent to the said preceding image frame as a "succeeding pixel value" one by one; comparing separately, within the two succeeding and preceding image frames, the "preceding pixel value" with the "succeeding pixel value" positioned in each of the same pixel-bit positions;

Defining a statistical mechanism to count the number of different pixel values in the same pixel-bit positions between the two preceding and succeeding image frames as a calculated value;

When the calculated value is greater than or equal to a first preset threshold, storing all the pixel values of the said preceding image frame in accordance with their original pixel-bit position information, and recording and storing the moment when such processing takes place and image frame sequence;

When the calculated value is less than the first preset threshold, comparing the "preceding pixel value" in the preceding image frame with the "succeeding pixel value" positioned in the same pixel-bit position in the succeeding image frame in the image sequence, and creating a recording program to record a number of times of consecutively repeated presence of the "preceding pixel value" in the pixel-bit position;

And proceeding as follows:

Step S1: by comparing, if the absolute value of the difference between the said "preceding pixel value" and the said "succeeding pixel value" equals to zero or is less than a second preset threshold, proceeding to the following steps:

Recording and/or storing the said "preceding pixel value";

The recording program updating, recording, and/or storing the number of times of consecutively repeated presence of the "preceding pixel value" in the said pixel-bit position in the image sequence;

When there is a subsequent image frame to be processed within the said image sequence, the said "preceding pixel value" remains as the "preceding pixel value" to continuously compare cyclically with a new "succeeding pixel value" that is the pixel value of the same pixel-bit position of a subsequent image frame adjacent to the said "succeeding image frame;

Step S2: by comparing, if the absolute value of the difference between the said "preceding pixel value" and the said "succeeding pixel value" is greater than the second preset threshold, proceeding to the following steps:

Recording and/or storing the said "preceding pixel value";

The recording program updating, recording, and/or storing the number of times of consecutively repeated presence of the "preceding pixel value" in the said pixel-bit sequence in the image sequence;

Recording and/or storing the said "succeeding pixel value";

The recording program updating, recording, and/or storing the number of times of consecutively repeated presence of the "succeeding pixel value" in the said pixel-bit position in the image sequence;

When there is a subsequent image frame to be processed within the said image sequence, the said "succeeding pixel value" is set as a new "preceding pixel value" to cyclically compare with a new "succeeding pixel value" that is a pixel value of the same pixel-bit position of a subsequent image frame adjacent to the succeeding image frame.

Further, the first pixel-bit position of the preceding image frame is any of the pixel-bit positions in the preceding image frame.

Further, the preceding image frame is any of the image frames in the image sequence.

Further, comparing the preceding image frame with another image frame that is previous and adjacent to the said preceding image frame, and at the same time comparing the preceding image frame with its succeeding image frame;

Recording and/or storing all the preceding pixel values in the preceding image frame, and the recording program updating, recording, and/or storing the number of times of consecutively repeated presence of the "preceding pixel value" in the said pixel-bit position in the image sequence, if the statistic number of the "preceding pixel values" which are unequal to the corresponding "succeeding pixel values" of each pixel-bit position included in the preceding image frame and the previous adjacent image frame is less than the first preset threshold, and at the same time, if the statistic number of the "preceding pixel values" which are unequal to the corresponding "succeeding pixel values" of each pixel-bit position included in the preceding image frame and the succeeding image frame equals to or is greater than the first preset threshold.

Further, storing all the pixel values of the nth image frame in accordance with their original pixel-bit position information, and recording and storing the moment when such processing takes place and/or the image frame sequence, when the preceding image frame is the $(n-1)^{th}$ image frame of the image sequence, and the statistic number of the "preceding pixel values" which are unequal to the corresponding "succeeding pixel values" of each pixel-bit position included in the two preceding and succeeding image frames equals to or is greater than the first preset threshold.

Further, recording and/or storing all "succeeding pixel values" of the nth image frame, and the recording program updating, recording, and/or storing the number of times of consecutively repeated presence of the "succeeding pixel value" in the said pixel-bit position in the image sequence, when the preceding image frame is the $(n-1)^{th}$ image frame of the image sequence, and the statistic number of the "preceding pixel values" which are unequal to the corresponding "succeeding pixel values" of each pixel-bit position included in the two preceding and succeeding image frames is less than the first preset threshold.

Preferably, either Step S1 or Step S2 is selected to process the "preceding pixel value" and the "succeeding pixel value", if the absolute value of the difference between the "preceding pixel value" and the "succeeding pixel value", after comparing, equals to the second preset threshold.

Preferably, the previous adjacent image frame of the preceding image frame is stored by way of an entire image frame at the rear end of the image sequence in the same storage space, when the preceding image frame needs to be stored by way of an entire image frame.

Preferably, storing the previous adjacent image frame of the preceding image frame by way of an entire image frame in the storage space different from where the image sequence is stored, when the preceding image frame needs to be stored by way of an entire image frame.

Preferably, the first preset threshold is relevant to the image resolution. For example, the first preset threshold can be 30%, 70% or 50% of the image resolution respectively.

Preferably, the second preset threshold is relevant to the pixel accuracy. For example, the second preset threshold can be set as 3, 6 and 20 respectively, when the pixel is 8 bit, 12 bit and 16 bit pixel respectively.

On the other hand, the present invention provides a method for compressing and storing an image sequence, so as to solve such problem as huge storage expense, longer time spent for storing, the large storage space, and low efficiency due to recording the movement vector when temporal redundancy (or "time domain redundancy") of the pixel value of the pixel-bit position in the image sequence is processed and stored in the prior art.

In order to solve the above technical problems, the present invention, in combination with the embodiments provided, discloses the following technical solution:

A method for compressing and storing an image sequence, comprising the following steps, Within the image sequence, forming a pixel-bit sequence according to known positions and order of each pixel in each of image frames formed by pixels;

Within the image sequence, setting a pixel value of each pixel-bit position of a preceding image frame as a "preceding pixel value" one by one, while setting the pixel value of the same pixel-bit position of the succeeding image frame adjacent to the said preceding image frame as a "succeeding pixel value," comparing the said "preceding pixel value" with the said "succeeding pixel value";

Creating a recording program to record a number of times of consecutively repeated presence of the "preceding pixel value" in the pixel-bit position;

Creating another recording program to count a number of times or a ratio of different pixel values in the same pixel-bit position between the preceding frame image and the adjacent succeeding frame image;

Wherein, comparing the said "preceding pixel value" with the said "succeeding pixel value", and proceeding as follows:

Step S1: by comparing, if the absolute value of the difference between the said "preceding pixel value" and the said "succeeding pixel value" equals to zero or is less than a first preset threshold, the said "preceding pixel value" shall be deemed to be equal to the said "succeeding pixel value", and hereafter proceeding to the following steps:

Recording and/or storing the said "preceding pixel value";

The recording program updating, recording, and/or storing the number of times of consecutively repeated presence of the "preceding pixel value" in the said pixel-bit position in the image sequence;

When there is a subsequent image frame to be processed within the said image sequence, the said "preceding pixel value" remains as the "preceding pixel value" to continuously compare cyclically with a new "succeeding pixel value" that is the pixel value of the same pixel-bit position of a subsequent image frame adjacent to the said "succeeding image frame;

Step S2: by comparing, if the absolute value of the difference between the said "preceding pixel value" and the said "succeeding pixel value" is greater than the first preset threshold, proceeding to the following steps:

Recording and/or storing the said "preceding pixel value";

The recording program updating, recording, and/or storing the number of times of consecutively repeated presence of the "preceding pixel value" in the said pixel-bit position in the image sequence;

Recording and/or storing the said "succeeding pixel value";

The recording program updating, recording, and/or storing the number of times of consecutively repeated presence of the "succeeding pixel value" in the said pixel-bit position in the image sequence;

The said another recording program counting and/or updating the number of times or the ratio of the occurrence where the "preceding pixel value" is not equal to the "succeeding pixel value", ever since processing the preceding image frame and the succeeding image frame, and if the number of times or the ratio is greater than or equal to a second preset threshold, storing all the pixel values of the said preceding image frame in accordance with their original pixel-bit position information, and recording and storing the moment when such processing takes place and image frame sequence.

When there is a subsequent image frame to be processed within the said image sequence, the said "succeeding pixel value" is set as a new "preceding pixel value" to cyclically compare with a new "succeeding pixel value" that is a pixel value of the same pixel-bit position of a subsequent image frame adjacent to the succeeding image frame.

Preferably, either Step S1 or Step S2 is selected to process the "preceding pixel value" and the "succeeding pixel value", if the absolute value of the difference between the "preceding pixel value" and the "succeeding pixel value", after comparing, equals to the second preset threshold.

Preferably, the first preset threshold is relevant to the pixel accuracy. For example, the first preset threshold can be set as 3, 6 and 20 respectively, when the pixel is 8 bit, 12 bit and 16 bit pixel respectively.

Preferably, the second preset threshold is relevant to the image resolution. For example, the second preset threshold can be either 30%, 70% or 50% of the image resolution respectively, or 50 times, 70 times, and so on.

Compared with the prior art, the method for compressing and storing an image sequence provided by the present invention has the following advantages:

When using an image sequence for compressing and storing, the common method for compressing and storing through an image sequence can not achieve a good compression effect, if the ratio of the number of the different pixel values appearing in the same pixel position in the two or more successive image frames of the image sequence is above a certain number. The above method for compressing and storing an image sequence will store the succeeding frame as an entire image frame and will not record the repeated times of the pixel at each pixel-bit position of the frame, when the ratio of the number of the different pixel values appearing in the same pixel position in the two or more successive image frames of the image sequence is above a certain number, so as to save more than 50% compression space as a lossless compression.

DETAILED DESCRIPTION OF THE PRESENT INVENTION

The present invention will be better understood and its contents, features and advantages will become more apparent by reference to the accompanying drawings and the embodiments described hereinafter, but the present invention is not limited to the embodiments.

The present invention provides a method for storing an image sequence, in which the image is processed and stored by statistically recording the repeated data content so as to decrease the data storage amount of the image in the image sequence. Meanwhile, as the storage information amount of the image is reduced effectively, the storage space occupied by the image and its storage expense decrease dramatically, therefore, lossless storage of the image can be realized.

Figure 1:
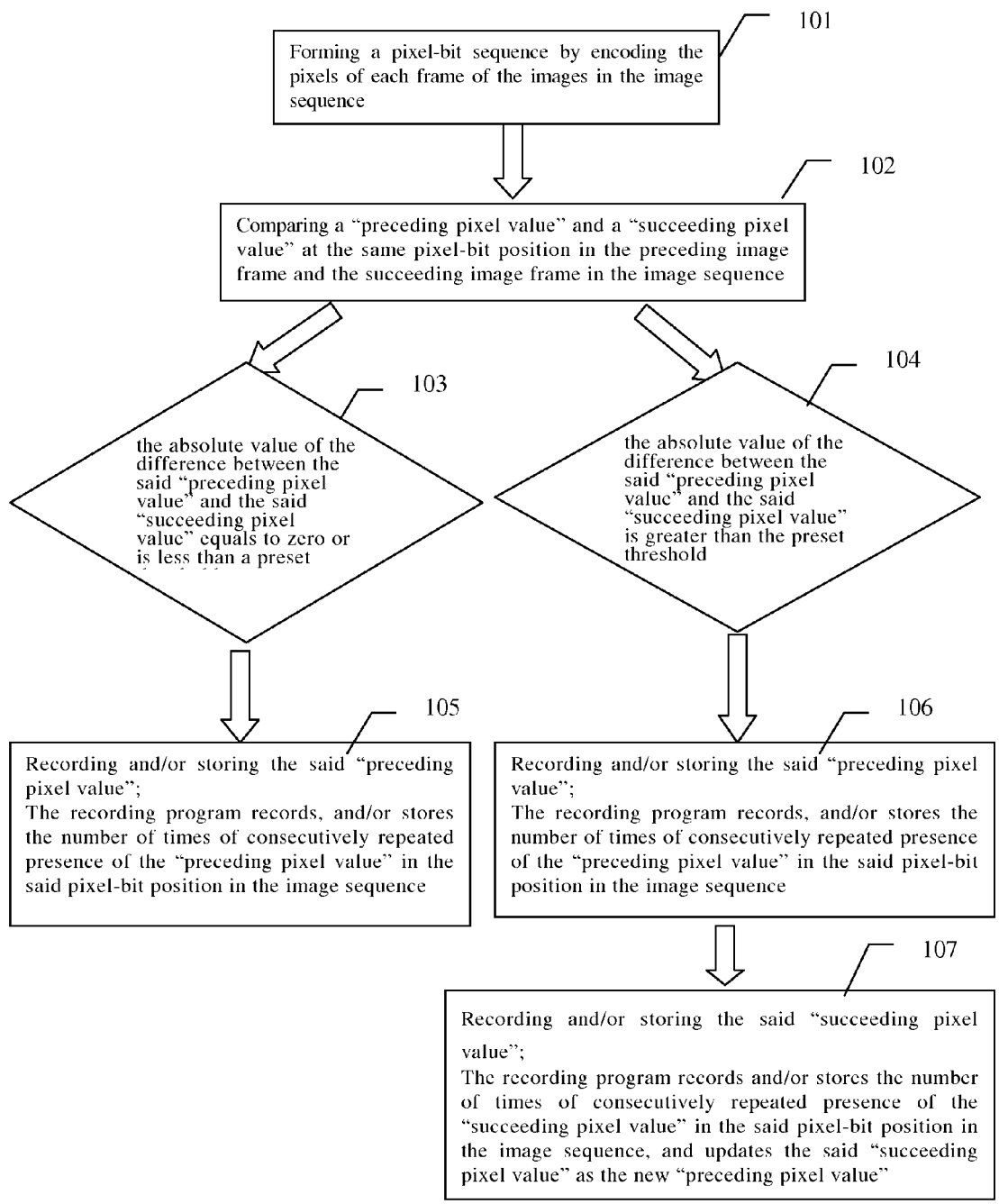
FIG. 1 shows a flow chart of the principle of the present invention.

As illustrated in FIG. 1, the present invention provides a method for storing an image sequence. In the image sequence, forming a pixel-bit sequence according to known positions and order of each pixel in each of image frames formed by pixels (Step 101);

Within the image sequence, setting a pixel value of a first pixel-bit position of a preceding image frame as a "preceding pixel value", while setting the pixel value of the same pixel-bit position of the succeeding image frame adjacent to the said preceding image frame as a "succeeding pixel value", comparing the said "preceding pixel value" with the said "succeeding pixel value" (Step 102);

Creating a recording program to record a number of times of consecutively repeated presence of the "preceding pixel value" in the pixel-bit position;

Wherein, comparing the said "preceding pixel value" with the said "succeeding pixel value", and proceeding as follows:

Step S1: by comparing, if the absolute value of the difference between the said "preceding pixel value" and the said "succeeding pixel value" equals to zero or is less than a preset threshold, the said "preceding pixel value" shall be deemed to be equal to the said "succeeding pixel value" (Step 103), and hereafter the following steps are proceeded:

Recording and/or storing the said "preceding pixel value";

The recording program updating, recording, and/or storing the number of times of consecutively repeated presence of the "preceding pixel value" in the said pixel-bit position in the image sequence (Step 105);

When there is a subsequent image frame to be processed within the said image sequence, the said "preceding pixel value" remains as the "preceding pixel value" to continuously compare cyclically with a new "succeeding pixel value" that is the pixel value of the same pixel-bit position of a subsequent image frame adjacent to the said "succeeding image frame";

Step S2: by comparing, if the absolute value of the difference between the said "preceding pixel value" and the said "succeeding pixel value" is greater than the preset threshold (Step 104), proceeding to the following steps:

Recording and/or storing the said "preceding pixel value";

The recording program updating, recording, and/or storing the number of times of consecutively repeated presence of the "preceding pixel value" in the said pixel-bit position in the image sequence (Step 106);

Recording and/or storing the said "succeeding pixel value";

The recording program updating, recording, and/or storing the number of times of consecutively repeated presence of the "succeeding pixel value" in the said pixel-bit position in the image sequence;

When there is a subsequent image frame to be processed within the said image sequence, the said "succeeding pixel value" is set as a new "preceding pixel value" to cyclically compare with a new "succeeding pixel value" that is a pixel value of the same pixel-bit position of a subsequent image frame adjacent to the succeeding image frame (Step 107).

Figure 2:
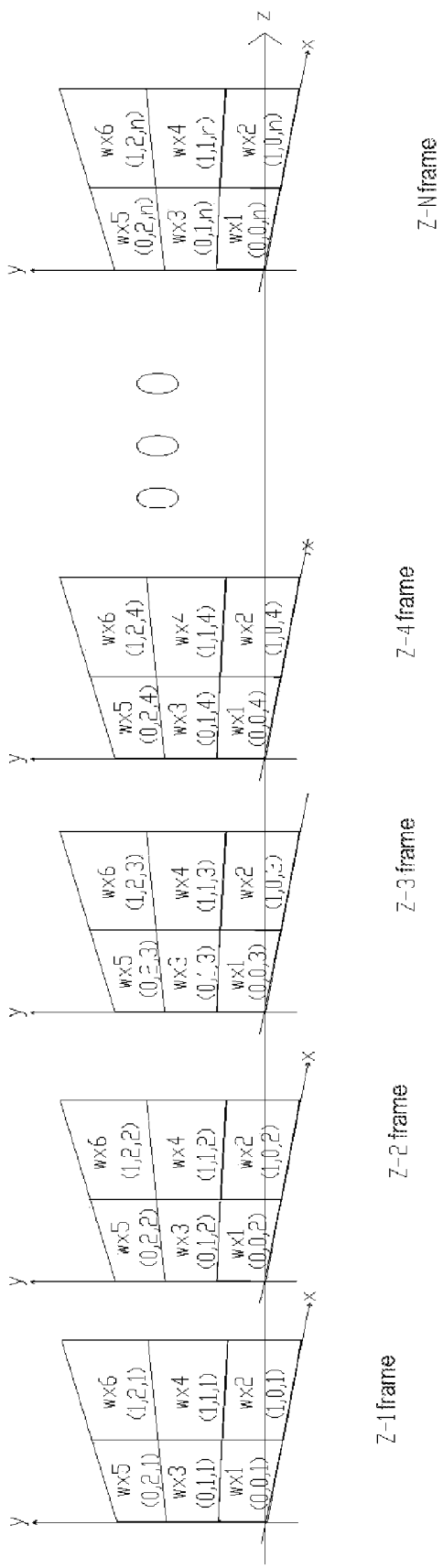
FIG. 2 shows a schematic diagram of encoding the image sequence according to the known formed pixel-bit positions of the pixels.

As illustrated in FIG. 2, individual pixel-bit position within the said image frame is arranged according to its known position and order as the first pixel position, the second pixel position, the third pixel position . . . and up to the nth pixel position respectively. The positions and order of all the effective pixels of each image frame in the image sequence are positioned and indicated by coordinates respectively. The information on the pixel-bit sequence within the image frame is the information generated by the known positions and order in the image sequence. As an illustrative explanation in FIG. 2: given that a vector Z is a temporal vector of an exemplary image sequence, and at the same time, is a frame sequence vector which indicates the image sequence, here, every image frame with six pixel positions is taken as an example.

In the (Z−1)th frame of the exemplary image sequence:

The pixel position is indicated by X=0, Y=0, Z=1 (set as pixel-bit position WX1); X=1, Y=0, Z=1 (set as pixel-bit position WX2); X=0, Y=1, Z=1 (set as pixel-bit position WX3); X=1, Y=1, Z=1 (set as pixel-bit position WX4); X=0, Y=2, Z=1 (set as pixel-bit position WX5); X=1, Y=2, Z=1 (set as pixel-bit position WX6), respectively.

In the (Z−2)th frame of the exemplary image sequence:

The image pixel position is indicated by X=0, Y=0, Z=2 (set as pixel-bit position WX1); X=1, Y=0, Z=2 (set as pixel-bit position WX2); X=0, Y=1, Z=2 (set as pixel-bit position WX3); X=1, Y=1, Z=2 (set as pixel-bit position WX4); X=0, Y=2, Z=2 (set as pixel-bit position WX5); X=1, Y=2, Z=2 (set as pixel-bit position WX6), respectively.

. . .

In the (Z−N)th frame of the exemplary image sequence:

The image pixel position is indicated by X=0, Y=0, Z=N (set as pixel-bit position WX1); X=1, Y=0, Z=N (set as pixel-bit position WX2); X=0, Y=1, Z=N (set as pixel-bit position WX3); X=1, Y=1, Z=N (set as pixel-bit position WX4); X=0, Y=2, Z=N (set as pixel-bit position WX5); X=1, Y=2, Z=N (set as pixel-bit position WX6), respectively.

Figure 3:
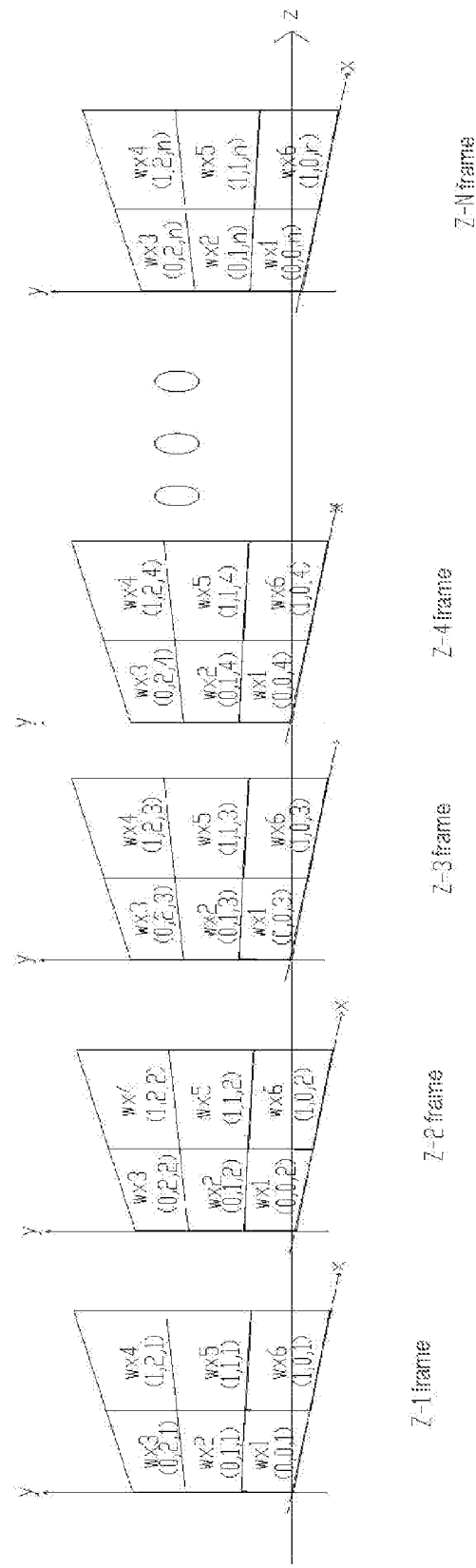
FIG. 3 shows a schematic diagram of encoding the image sequence according to the pixel positions and order which are obtained by setting and encoding with certain regular feature.

As illustrated in FIG. 3, individual pixel-bit position within the said image frame is arranged according to its known position and order as the first pixel position, the second pixel position, the third pixel position . . . and up to the nth pixel position respectively. The positions and order of all the effective pixels of each image frame in the image sequence are positioned and indicated by coordinates respectively. The information on pixel-bit sequence within the image frame is the information generated by the known positions and order in the image sequence. As an illustrative explanation: given that a vector Z is a temporal vector of an exemplary image sequence, and at the same time, is a frame sequence vector which indicates the image sequence, here, every image frame with six pixel positions is taken as an example.

In the (Z−1)th frame of the exemplary image sequence:

The image pixel position is indicated by X=0, Y=0, Z=1 (set as pixel-bit position WX1); X=1, Y=0, Z=1 (set as pixel-bit position WX2); X=0, Y=2, Z=1 (set as pixel-bit position WX3); X=1, Y=2, Z=1 (set as pixel-bit position WX4); X=1, Y=1, Z=1 (set as pixel-bit position WX5); X=1, Y=0, Z=1 (set as pixel-bit position WX6), respectively.

In the (Z−2)th frame of the exemplary image sequence:

The image pixel position is indicated by X=0, Y=0, Z=2 (set as pixel-bit position WX1); X=1, Y=1, Z=2 (set as pixel-bit position WX2); X=0, Y=2, Z=2 (set as pixel-bit position WX3); X=1, Y=2, Z=2 (set as pixel-bit position WX4); X=1, Y=1, Z=2 (set as pixel-bit position WX5); X=1, Y=0, Z=2 (set as pixel-bit position WX6), respectively.

...

In the (Z−N)th frame of the exemplary image sequence:

The image pixel position is indicated by X=0, Y=0, Z=N (set as pixel-bit position WX1); X=0, Y=1, Z=N (set as pixel-bit position WX2); X=0, Y=2, Z=N (set as pixel-bit position WX3); X=1, Y=1, Z=N (set as pixel-bit position WX4); X=1, Y=1, Z=N (set as pixel-bit position WX5); X=1, Y=0, Z=N (set as pixel-bit position WX6), respectively.

As known from FIG. 2 and FIG. 3, because of the use of the information on pixel-bit sequence resulted from the known arrangement of the pixels in the image sequence, it is not necessary to record and store the data generated from the movement vector when each image frame is compressed. Instead it only needs to set the information of pixel-bit sequence at the beginning of digital image processing or to set several kinds of information of pixel-bit sequence in the image sequence. In this way, it will decrease the stored data because many data can be omitted in multi-frame image sequence.

A vector Z is a temporal vector of an exemplary image sequence, and at the same time, is a frame sequence vector which indicates the image sequence.

Here, only taking a image sequence, in which every image frame includes two pixels, as an example, wherein the position of one pixel is indicated by x=0, y=0 (i.e., pixel-bit position 1), and the position of the other pixel is indicated by x=1, y=0 (i.e., pixel-bit position 2).

Given that the pixel value of pixel-bit position 1 in the exemplary image sequence is always "120".

Given that the pixel value of pixel-bit position 2 in the exemplary image sequence is "000" in the (Z-0)th frame of the image sequence and is "0" in the (Z−1)th frame of the image sequence. At the same time, it is known that the pixel value of the pixel-bit position 2 is "255" from the (Z−2)th frame till the (Z−n) the frame.

However, when the initial image frame and its adjacent or subsequent image frame of the image sequence are ready to be processed:

In the (Z−0)th frame:

Pixel-bit position 1 is encoded as follows: the pixel value is recorded as "120", and its repeated times is set as "0" (the initial value);

Pixel-bit position 2 is encoded as follows: the pixel value is recorded as "0", and its repeated times is set as "0" (the initial value).

In the (Z−1)th frame:

Pixel-bit position 1 is encoded as follows: since the pixel value of pixel-bit position 1 remains "120", its repeated times increases "1", i.e., its repeated times thus is 1;

Pixel-bit position is encoded as follows: since the pixel value of pixel-bit position 2 remains "0", its repeated times increases "1", i.e., its repeated times thus is 1;

In the (Z−2)th frame:

Pixel-bit position 1 is encoded as follows: since the pixel value of pixel-bit position 1 remains "120", its repeated times increases "1", i.e., its repeated times thus is 2;

Pixel-bit position 2 is encoded as follows: since the pixel value of pixel-bit position 2 changes from "0" into "255", its pixel value is recorded as "255", and the repeated times of the pixel value "255" is set as "0" (the initial value);

In the (Z−3)th frame:

Pixel-bit position 1 is encoded as follows: since the pixel value of pixel-bit position 1 remains "120", its repeated times increases "1", i.e., its repeated times thus is 3;

Pixel-bit position 2 is encoded as follows: since the pixel value of pixel-bit position 2 remains "255", its repeated times increases "1", i.e., its repeated times of the pixel value "255" thus is 1.

...

In the (Z−n)th frame:

Pixel-bit position 1 is encoded as follows: since the pixel value of pixel-bit position 1 remains "120", its repeated times increases "1", i.e., its repeated times thus is n;

Pixel-bit position 2 is encoded as follows: since the pixel value of pixel-bit position 2 remains "255", its repeated times increases "1", i.e., the repeated times of the pixel value "255" thus is n−2.

Figure 4:
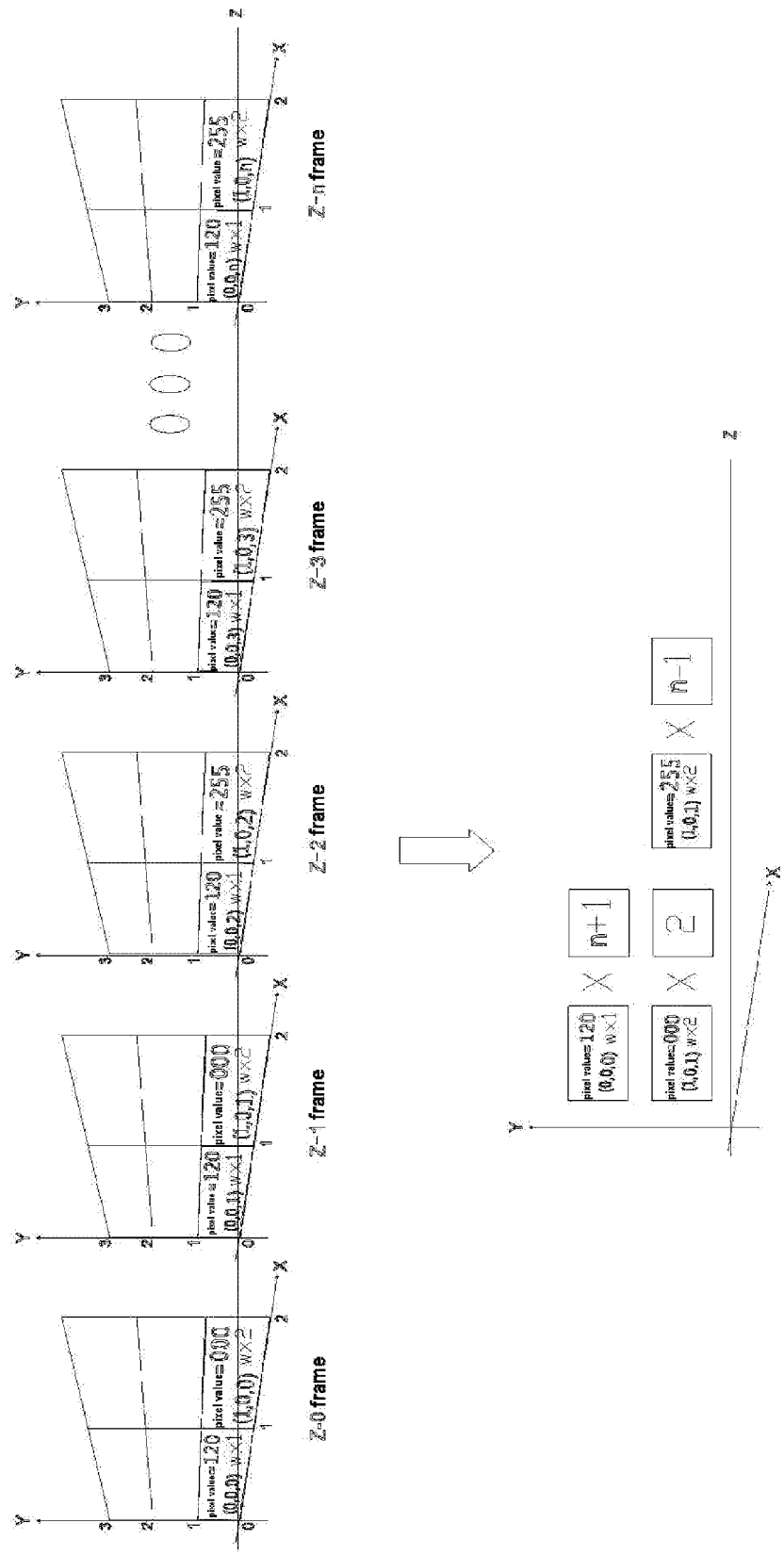
FIG. 4 shows a configurable schematic diagram of the encoding principle of the image sequence of the present invention.

As illustrated in FIG. 4, when the same pixel-bit position of every image frame in an image sequence has the same pixel value, it is not necessary to store the pixel value repeatedly, that is to say, when the same pixel-bit position in subsequent image frames has the same pixel value, the pixel value can be stored by a simple multiple method.

The present invention provides a method for storing an image sequence, wherein, when temporal redundancy (or "time domain redundancy") of the pixel value of the pixel-bit position in the image sequence is stored, the image is stored by statistically recording the number of times of consecutively repeated presence of the same pixel value, so as to decrease the data storage amount. At the same time, when the same pixel value continuously appears in the same pixel-bit position of every image frame in the image sequence, it is not necessary to repeatedly store it, so that the cost for recording data and storing them is further reduced.

By utilizing the present invention, the image data amount to be stored is reduced dramatically, and the data amount used for indicating the same image information is also reduced effectively, and thus the speed and efficiency of the image data processing is improved a lot. Therefore, the present invention possesses the prominent substantive features and obvious technical progress. In addition, the present invention can solve the technical difficulty of image lossless storage and compression, which has been desirable to be solved but has not been accomplished, overcome the technical prejudice that the compression ratio of the video lossless compression is hardly bigger than 1:51, and bring about the unexpected technical effect of lossless compression and storage of video images.

The method of compressing and storing an image sequence of the present invention will be elucidated in detail together with the attached drawings in the following.

Figure 5:
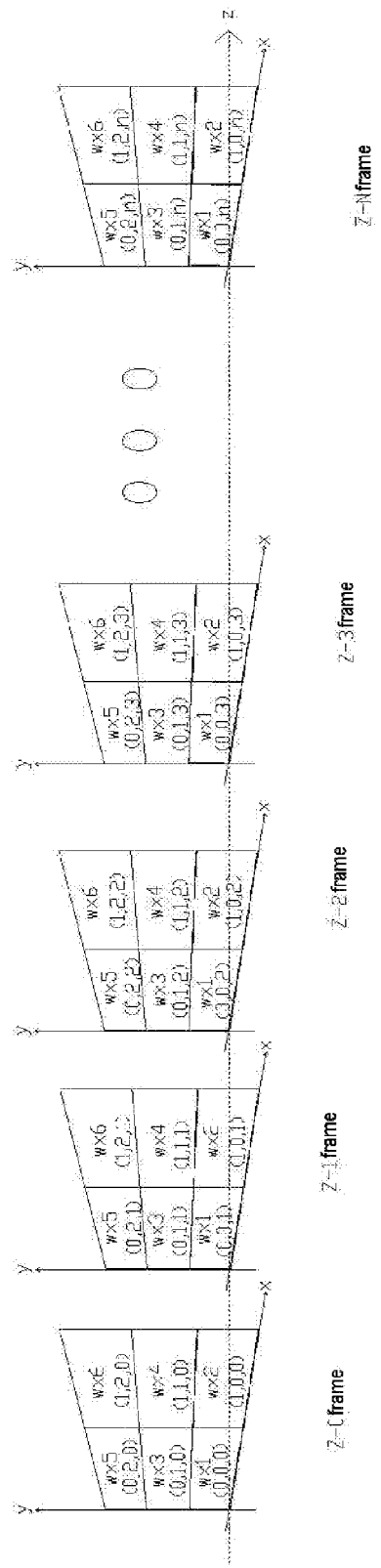
FIG. 5 shows a schematic diagram of encoding the image sequence according to the pixel positions and sequences obtained from the pixel-bit position in the image sequence.

As illustrated in FIG. 5, when the temporal redundancy (or "time domain redundancy") of the pixel value of the pixel-bit position in the image feature sequence is stored, the movement vector of the pixel-bit of the image included in the image sequence is recorded by the encoded and known information of the pixel-bit position in the related frames, so as to decrease the stored data amount of the image feature sequence; Specifically, a pixel value of the preceding pixel-bit position of the preceding image frame in the image feature sequence is set as "a preceding pixel value", wherein the pixel-bit position is formed naturally or set according to the regular features. Furthermore, the pixel value of the same pixel-bit position of the succeeding image frame in the image sequence is set as "a succeeding pixel value". The "preceding pixel value" is compared with the "succeeding pixel value". In addition, a recording program is created to record the number of times of consecutively repeated presence of the said preceding pixel value at the pixel-bit position in the image sequence The following processing is made:

Step S1, by comparing, if the absolute value of the difference between the said "preceding pixel value" and the said "succeeding pixel value" equals to zero or is less than a preset threshold, the following processing is made:

Recording and/or storing the said "preceding pixel value";

The recording program updates, records and/or stores the number of times of consecutively repeated presence of the said preceding pixel value at the pixel-bit position in the image sequence;

Step S2: by comparing, if the absolute value of the difference between the said "preceding pixel value" and the said "succeeding pixel value" is greater than a preset threshold, the following process is made:

Recording and/or storing the said "preceding pixel value";

The recording program updates, records and/or stores the counts of the continuously repeating occurrence of the said preceding pixel value at the pixel sequence in the image sequence;

Recording and/or storing the said "succeeding pixel value";

The recording program updates, records and/or stores the counts of the continuously repeating occurrence of the said preceding pixel value at the pixel-bit position in the image sequence;

The pixel-bit sequence of the first image frame or a certain image frame in the image feature sequence is encoded, a few of or all of the image frames behind the first image frame or the certain image frame are encoded using the same pixel-bit sequence.

Figure 6:
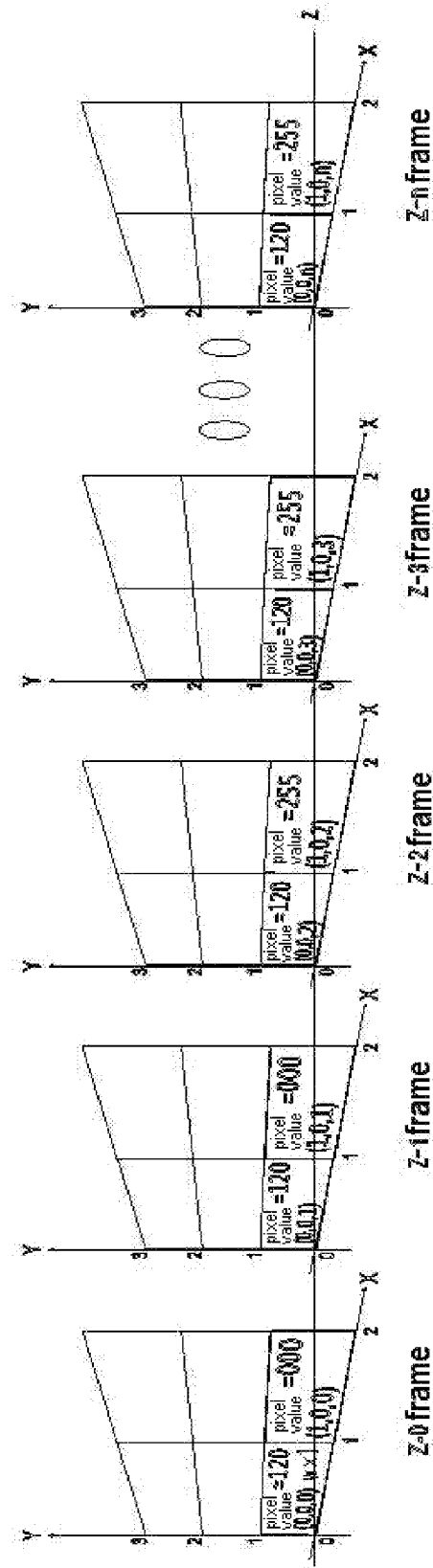
FIG. 6 shows a configurable schematic diagram of the recording device storing the repeated times of the same pixel value at the same pixel-bit position in the image sequence.

As illustrated in FIG. 6, as for the two adjacent image frames, a pixel value of the preceding pixel-bit position of the preceding image frame of the image feature sequence is set as "a preceding pixel value", wherein the pixel-bit position is formed naturally or set according to the regular features. Furthermore, the pixel value of the same pixel-bit position of the succeeding image frame in the image sequence is set as "a succeeding pixel value". The "preceding pixel value" is compared with the "succeeding pixel value". In addition, a recording program is created to record the number of times of consecutively repeated presence of the said preceding pixel value at the pixel-bit position in the image sequence. In the subsequent image sequence, when the "succeeding pixel value" is determined to be "equal" to the "preceding pixel value", the recording program starts to record the number of times of consecutively repeated presence of the said preceding pixel value at the pixel-bit position in the image sequence.

Figure 7:
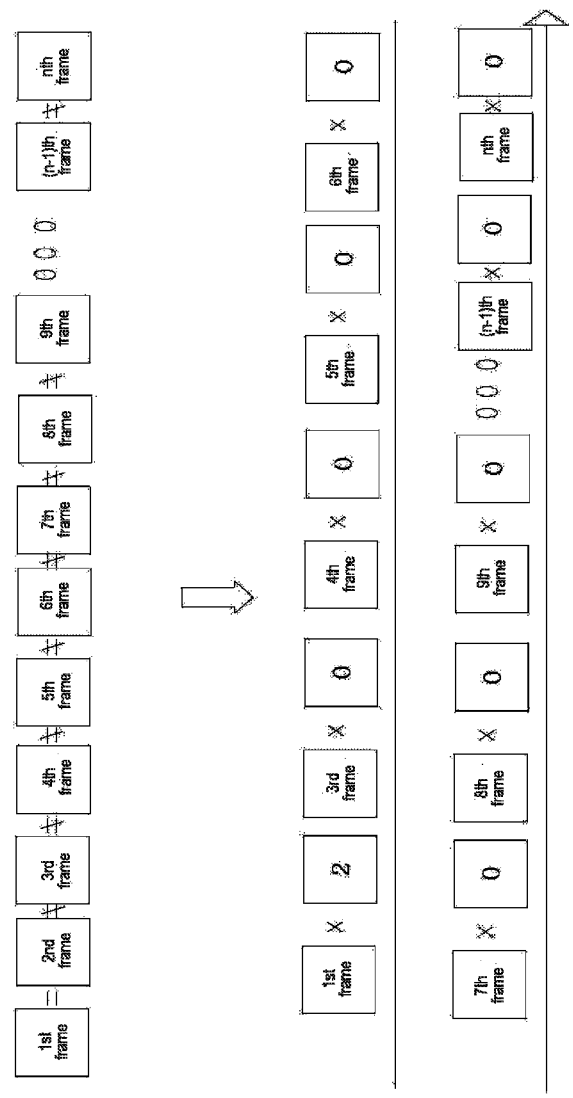
FIG. 7 shows a configurable schematic diagram of the encoding principle of the image sequence of the present invention.

FIG. 7 shows the following procedure: encoding and positioning the pixel-bit sequence in the image feature sequence, and then comparing the pixel values of the same pixel-bit position of the two successive image frames, meanwhile, creating a recording program to record the number of times of consecutively repeated presence of the "preceding pixel value" at the pixel-bit position in the image sequence. The method of storing an image sequence of the present invention uses the image sequence and compares the pixel values of the same pixel-bit position of the two successive image frames, and thus may avoid repeatedly storing the same pixel value, that is to say, when the same pixel value continuously appears in a pixel-bit sequence, only both the pixel value and its repeated times are recorded. Therefore, the more the number of times of consecutively repeated presence of the same pixel values in the successive same pixel-bit sequences is, the bigger the corresponding compressed space can be achieved.

However, there is a technical problem existing in the above method for storing an image feature sequence, that is to say, when the ratio of the number of the different pixel values appearing in the same pixel-bit position in the successive image frames of the image sequence is above a certain number, the above method of storing an image sequence by matching the pixel values with their repeated counts will not bring a good compressing effect, to the contrary, it may probably increase the storage amount of the compressed image sequence.

Figure 8:
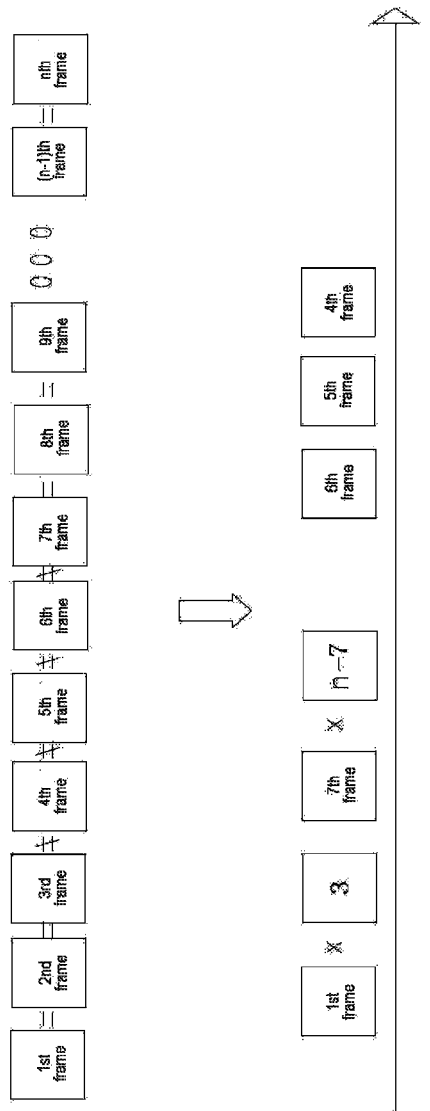
FIG. 8 shows a configurable schematic diagram of one embodiment of the method for compressing and storing an image sequence.

FIG. 8 shows a method for compressing and storing an image sequence according to one embodiment of the present invention. In the frame sequence of the image sequence, taking every image frame with only one pixel value as an example, given that the statistic number of the "succeeding pixel values" which are unequal to the corresponding "preceding pixel values" of each of the pixel-bit positions in the two successive image frames among the $1^{st}$ frame, the $2^{nd}$ frame and the $3^{rd}$ frame is less than the preset threshold, and that the statistic number of the "succeeding pixel values" which are unequal to the corresponding "preceding pixel values" of each of the pixel-bit positions in the two successive image frames among the $3^{rd}$ frame, the $4^{th}$ frame, the $5^{th}$ frame, the $6^{th}$ frame and the $7^{th}$ frame is greater than or equals to the preset threshold, and that the statistic number of the "succeeding pixel values" which are unequal to the corresponding "preceding pixel values" of each of the pixel-bit positions in the successive two image frames among the $7^{th}$ frame, the $8^{th}$ frame, the $9^{th}$ frame, till the $n^{th}$ frame is less than the preset threshold.

The compressing and storing the above image sequence according to the present invention include:

When the statistic number of the "succeeding pixel values" appearing in the $2^{nd}$ frame which are unequal to the corresponding "preceding pixel values" in the $1^{st}$ frame after comparing the pixel values of each of the pixel-bit positions in the $1^{st}$ frame and the $2^{nd}$ frame is less than the preset threshold, the $1^{st}$ frame is compressed and stored, and the repeated times of the pixel value in the $1^{st}$ frame is recorded as 1.

When the statistic number of the "succeeding pixel values" appearing in the $3^{rd}$ frame which are unequal to the corresponding "preceding pixel values" in the $2^{nd}$ frame after comparing the pixel values of each of the pixel-bit positions among the $2^{nd}$ frame and the $3^{rd}$ frame is less than the preset threshold, the $2^{nd}$ frame is compressed and stored. Since the statistic number of the "succeeding pixel values" in the $2^{nd}$ frame which are unequal to the corresponding "preceding pixel values" in the $1^{st}$ frame after comparing the pixel values of each of pixel-bit positions among the $1^{st}$ frame and the $2^{nd}$ frame is less than the preset threshold, the repeated times of the pixel value among the $1^{st}$ frame and the $2^{nd}$ frame is recorded as 2.

When the statistic number of the "succeeding pixel values" appearing in the $4^{th}$ frame which are unequal to the corresponding "preceding pixel values" in the $3^{rd}$ frame after comparing the pixel values of each of pixel-bit positions in the $3^{rd}$ frame and the $4^{th}$ frame is greater than or equals to the preset threshold, and since the statistic number of the "succeeding pixel values" in the $3^{rd}$ frame which are unequal to the corresponding "preceding pixel values" in the $2^{nd}$ frame after comparing the pixel values of each of the pixel-bit positions between the $2^{nd}$ frame and the $3^{rd}$ frame is less than the preset threshold, all the pixels in the $3^{rd}$ frame are still stored according to the known information of pixel-bit sequence and/or the information of pixel-bit sequence which is obtained by man-made setting and encoding. The pixel value in the pixel-bit position in the $3^{rd}$ image frame is compared with that in its previous adjacent image frame, i.e., the $2^{nd}$ image frame, and the number of times of consecutively repeated presence of the pixel value is recorded and stored, and then the $3^{rd}$ image frame is compressed and stored, at this time, the number of times of consecutively repeated presence of the pixel value of the $2^{nd}$ image frame is recorded repeatedly as "1"; since the statistic number of the "succeeding pixel values" in the $2^{nd}$ frame which are unequal to the corresponding "preceding pixel values" in the $1^{st}$ frame after comparing the pixel values of each of pixel-bit positions among the $2^{nd}$ frame and the $1^{st}$ frame is less than the preset threshold, the number of times of consecutively repeated presence of the pixel value of the $1^{st}$ frame is recorded as "3" when the $1^{st}$ frame, the $2^{nd}$ frame, and the $3^{rd}$ frame are compressed and stored.

When the statistic number of the "succeeding pixel values" in the $5^{th}$ frame which are unequal to the corresponding "preceding pixel values" in the $4^{th}$ frame after comparing the pixel values of each of the pixel-bit positions among the $4^{th}$ frame and the $5^{th}$ frame is greater than or equals to the preset threshold, the $4^{th}$ frame is compressed and stored, i.e., all the pixels of the $4^{th}$ frame is stored entirely according to information of pixel-bit sequence and/or the information of pixel-bit sequence which is obtained by man-made setting and encoding. In addition, the moment the above processing takes place and/or the frame sequence in the image sequence are accordingly recorded and/or stored.

When the statistic number of the "succeeding pixel values" in the $6^{th}$ frame which are unequal to the corresponding "preceding pixel values" in the $5^{th}$ frame after comparing the pixel values of each of the pixel-bit positions among the $4^{th}$ frame and the $5^{th}$ frame is greater than or equals to the preset threshold, the $5^{th}$ frame is compressed and stored, i.e., all the pixels of the $4^{th}$ frame is stored entirely according to the known information of pixel-bit sequence and/or the information of pixel-bit sequence which is obtained by man-made setting and encoding. In addition, the moment the above processing takes place and/or the frame sequence in the image sequence is accordingly recorded and/or stored.

. . .

When the statistic number of the "succeeding pixel values" in the $8^{th}$ frame which are unequal to the corresponding "preceding pixel values" in the $7^{th}$ frame after comparing the pixel values of each of the pixel-bit positions among the $7^{th}$ frame and the $8^{th}$ frame is less than the preset threshold, the $7^{th}$ frame is compressed and stored, and the repeated times of the pixel value of the $7^{th}$ frame is recorded as "1".

When the statistic number of the "succeeding pixel values" in the $9^{th}$ frame which are unequal to the corresponding "preceding pixel values" in the $8^{th}$ frame after comparing the pixel values of each of the pixel-bit positions among the $8^{th}$ frame and the $9^{th}$ frame is less than the preset threshold, the $7^{th}$ frame and the $8^{th}$ frame are compressed and stored, and the repeated times of the pixel value of the $7^{th}$ frame is recorded as "2".

When the statistic number of the "succeeding pixel values" in the $n^{th}$ frame which is unequal to the corresponding "preceding pixel values" in the $(n-1)^{th}$ frame after comparing the pixel values of each of pixel-bit positions in the $n^{th}$ frame and the $(n-1)^{th}$ frame is less than the preset threshold, the $7^{th}$ frame, the $8^{th}$ frame, till the $(n-1)^{th}$ frame are compressed and stored, and the repeated times of the pixel value of the $7^{th}$ frame is recorded as "n-7".

When the statistic number of the "succeeding pixel values" in the $n^{th}$ frame the which are unequal to the corresponding "preceding pixel values" in the $(n-1)^{th}$ frame after comparing the pixel values of each of the pixel-bit positions among the $n^{th}$ frame and the $(n-1)^{th}$ frame is less than the preset threshold, and the repeated times of the pixel value of the $7^{th}$ frame is recorded as "n-6" when the $7^{th}$ frame to the $n^{th}$ frame are compressed and stored.

Figure 9:
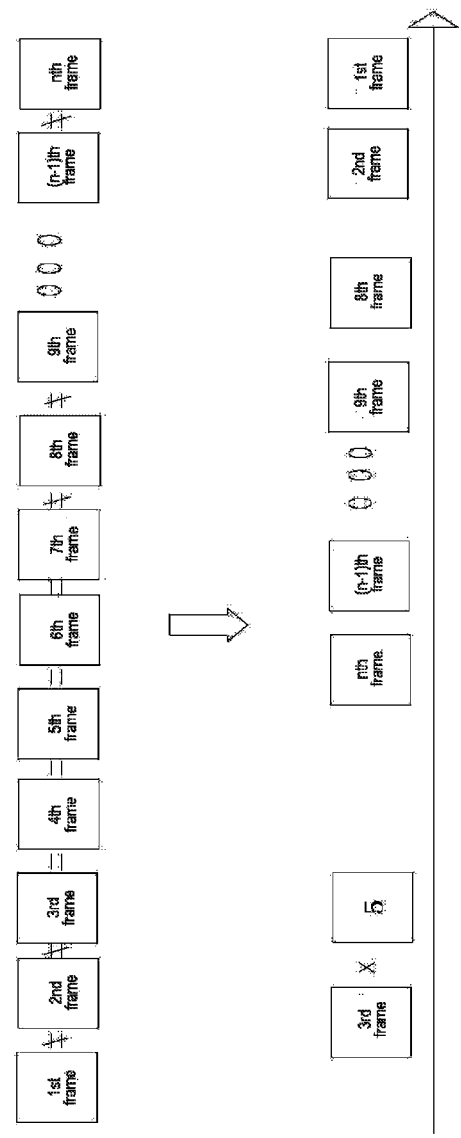
FIG. 9 shows a configurable schematic diagram of another embodiment of the method for compressing and storing an image sequence.

FIG. 9 shows a method for compressing and storing an image sequence according to another embodiment of the present invention. In the frame sequence of the image sequence, taking every frame with only one pixel as an example, given that the statistic number of the "succeeding pixel value" which is unequal to corresponding "preceding pixel value" of the pixel-bit position in the two successive image frames among the $1^{st}$ frame, the $2^{nd}$ frame, and the $3^{rd}$ frame is greater than or equals to the preset threshold, the statistic number of the "succeeding pixel value" which is unequal to the corresponding "preceding pixel value" of the pixel-bit position in the two successive image frames among the $3^{st}$ frame, the $4^{th}$ frame, the $5^{th}$ frame, the $6^{th}$ frame, and the $7^{th}$ frame is less than the preset threshold, and the statistic number of the "succeeding pixel value" which is unequal to the corresponding "preceding pixel value" of the pixel-bit position in the two successive image frames among the $7^{th}$ frame, the $8^{th}$ frame, the $9^{th}$ frame, till the $n^{th}$ frame is greater than or equals to the preset threshold.

The compressing and storing an image sequence according to the present invention include:

When the statistic number of the "succeeding pixel value" which is unequal to the corresponding "preceding pixel value" at the pixel-bit position among the $1^{st}$ frame and the $2^{nd}$ frame is greater than or equals to the preset threshold, the $1^{st}$ frame is compressed and stored, i.e., the pixel in the $1^{st}$ frame is still stored according to the known information of pixel-bit sequence and/or the information of pixel-bit sequence which is obtained by man-made setting and encoding. In addition, the moment the processing takes place and/or the frame sequence in the image sequence are accordingly recorded and/or stored. When the $1^{st}$ frame needs to be stored in an entire frame, the entire $1^{st}$ image frame is stored at the rear end of the image sequence in the same storage space;

When the statistic number of the "succeeding pixel value" which is unequal to the corresponding "preceding pixel value" at the pixel-bit position in both the $2^{nd}$ frame and the $3^{rd}$ frame is greater than or equals to the preset threshold, the $2^{nd}$ frame is compressed and stored, i.e., all the pixel in the $2^{nd}$ frame is still stored according to the known information of pixel-bit sequence and/or the information of pixel-bit sequence which is obtained by man-made setting and encoding. In addition, the moment the processing takes place and/or the frame sequence in the image sequence are accordingly recorded and/or stored. When the $2^{nd}$ frame needs to be stored by way of an entire frame, the entire the $2^{nd}$ image frame is stored at the rear end of the image sequence in the same storage space;

When the statistic number of the "succeeding pixel value" which is unequal to the corresponding "preceding pixel value" of the pixel-bit position among both the $3^{rd}$ frame and the $4^{th}$ frame is greater than or equals to the preset threshold, the $3^{rd}$ frame is compressed and stored, and the repeated times of the pixel value of the $3^{rd}$ frame is recorded as "1".

When the statistic number of the "succeeding pixel values" in the $5^{th}$ frame which is unequal to the corresponding "preceding pixel values" in the $4^{th}$ frame after comparing the pixel values of the pixel-bit position among the $4^{th}$ frame and the $5^{th}$ frame is less than the preset threshold, the repeated times of the pixel value of the $3^{rd}$ frame is recorded as "2" when the $3^{rd}$ frame and the $4^{th}$ frame are compressed and stored.

. . .

When the statistic number of the "succeeding pixel values" in the $7^{th}$ frame which is unequal to the corresponding "preceding pixel values" in the $6^{th}$ frame after comparing the pixel values of the pixel-bit position among the $6^{th}$ frame and the $7^{th}$ frame is less than the preset threshold, the repeated times of the pixel value of the $3^{rd}$ frame is recorded as "4" when the $3^{rd}$ frame to the $6^{th}$ frame are compressed and stored.

When the statistic number of the "succeeding pixel value" in the $8^{th}$ frame which is unequal to the corresponding "preceding pixel value" in the $7^{th}$ frame after comparing the pixel values of the pixel-bit position among the $7^{th}$ frame and the $8^{th}$ frame is greater than or equals to the preset threshold, since the statistic number of the "succeeding pixel values" in the $7^{th}$ frame which is unequal to the corresponding "preceding pixel values" in the $6^{th}$ frame after comparing the pixel values of the pixel-bit position among the $6^{th}$ frame and the $7^{th}$ frame is less than the preset threshold, the pixel in the $7^{th}$ frame is still stored according to the known information of pixel-bit sequence and/or the information of pixel-bit sequence which is obtained by man-made setting and encoding. The pixel value of the pixel-bit position in the $7^{th}$ image frame is compared with that in its previous adjacent image frame, i.e., the $6^{th}$ image frame, the number the times of its consecutively repeated presence is recorded and stored, and the pixel value of the $6^{th}$ image frame is recorded once repeatedly when the $7^{th}$ image frame is compressed and stored; since the statistic number of the "succeeding pixel values" in the $6^{th}$ frame which is unequal to the corresponding "preceding pixel values" in the $3^{rd}$ frame after comparing the pixel values of the pixel-bit position among the $6^{th}$ frame and the $3^{rd}$ frame is less than the preset threshold, the number of the times of the repeated presence of the pixel value of the $3^{rd}$ frame is recorded as "5" when the $3^{rd}$ frame to the $7^{th}$ frame are compressed and stored.

When the statistic number of the "succeeding pixel value" in the $n^{th}$ frame which is unequal to the corresponding "preceding pixel value" in the $(n-1)^{th}$ frame after comparing the pixel values of the pixel-bit position among the $(n-1)^{th}$ frame and the $n^{th}$ frame is greater than or equals to the preset threshold, the $(n-1)^{th}$ frame is compressed and stored, i.e., the pixel in the $(n-1)^{th}$ frame is stored according to the known information of pixel-bit sequence and/or the information of pixel-bit sequence which is obtained by man-made setting and encoding. In addition, the moment the above processing takes place and/or the frame sequence in the image sequence are accordingly recorded and/or stored. When the $(n-1)^{th}$ frame needs to be stored in an entire frame, the entire $(n-1)^{th}$ image frame is stored at the rear end of the image sequence in the same storage space;

When the statistic number of the "succeeding pixel value" in the $n^{th}$ frame which is unequal to the corresponding "preceding pixel value" in the $(n-1)^{th}$ frame after comparing the pixel values of the pixel-bit position among the $(n-1)^{th}$ frame and the $n^{th}$ frame is greater than or equals to the preset threshold, the $n^{th}$ frame is processed, compressed and stored i.e., the pixel in the $n^{th}$ frame is and stored according to the known information of pixel-bit sequence and/or the information of pixel-bit sequence which is obtained by man-made setting and encoding. In addition, the moment the above processing takes place and/or the frame sequence in the image sequence is accordingly recorded and/or stored. When the $n^{th}$ frame needs to be stored in an entire frame, the entire $n^{th}$ image frame is stored at the rear end of the image sequence in the same storage space.

Although the present invention has been described in connection with the specified embodiments, it is not intended to be limited to the specific form set forth herein. It should be appreciated that numerous modifications and alternations may be made by those having ordinary skill in the art without departing from the broader and intended spirit and scope of the present invention as set forth in the claims that follow.

The invention claimed is:

1. A method for storing an image sequence, comprising:
   forming a pixel-bit sequence, each pixel bit corresponding to a position and order of each pixel in each of image frames of the image sequence;
   comparing a preceding pixel value representing a pixel value of each pixel-bit position of a preceding image frame with a succeeding pixel value representing a pixel value of a corresponding pixel-bit position of a succeeding image frame; and
   recording a number of times of a preceding pixel value that occurs in consecutive image frames in the image sequence, wherein the comparing and the recording comprise
   (a) if an absolute value of a difference between a preceding pixel value and a succeeding pixel value is less than a predetermined threshold,
      treating the preceding pixel value equal to the succeeding pixel value,
      recording the preceding pixel value in place of the succeeding pixel value, and
      storing the number of times of the preceding pixel value in a corresponding pixel-bit position in the image sequence, wherein when there is a subsequent image frame to be processed within the image sequence, the preceding pixel value remains as a preceding pixel value to be used iteratively compare with a new succeeding pixel value corresponding to the same pixel-bit position of a subsequent image frame adjacent to the succeeding image frame;
   (b) if the absolute value of the difference between the preceding pixel value and the succeeding pixel value is greater than the predetermined threshold,
      recording and/or storing the preceding pixel value, and
      storing the number of times of consecutively repeated presence of the preceding pixel value in the corresponding pixel-bit position in the image sequence;
   (c) otherwise recording the remaining succeeding pixel value and storing the number of times of consecutively repeated presence of the succeeding pixel value in the pixel-bit position in the image sequence, wherein when there is a subsequent image frame to be processed within the image sequence, the succeeding pixel value is set as a new preceding pixel value to be used to iteratively compare with a new succeeding pixel value that is a pixel value of the same pixel-bit position of a subsequent image frame adjacent to the succeeding image frame.

2. The method of claim 1, wherein either step (a) or step (b) is selected to process a preceding pixel value and a succeeding pixel value, if the absolute value of the difference between the preceding pixel value and the succeeding pixel value, after the comparing, equals to the predetermined threshold.

3. The method of claim 1, wherein position and sequence of each effective pixel of each image frame in the image sequence are positioned and indicated by coordinates.

4. The method of claim 1, wherein the image sequence is processed in response to obtaining a preceding image frame and a succeeding image frame, and continuing the processing until all image frames of the image sequence are processed in sequence.

5. The method of claim 1, wherein the image sequence is processed upon completion of collecting all the image frames of the image sequence and continuing the processing until all the image frames of the image sequence are processed in sequence, or the image sequence is processed upon collecting a portion of the image frames of the image sequence, and continuing the processing until all the image frames of the image sequence are processed in sequence.

6. A method for compressing and storing an image sequence, comprising:

forming a pixel-bit sequence according to known positions and order of each pixel in each of image frames of the image sequence;

setting a pixel value of each pixel-bit position of a preceding image frame as a preceding pixel value, wherein setting the pixel value of each of the same pixel-bit position of a succeeding image frame adjacent to the preceding image frame as a succeeding pixel value;

comparing within the two succeeding and preceding image frames, a preceding pixel value with a succeeding pixel value positioned in each of the same pixel-bit positions;

using a statistical mechanism to count a number of different pixel values in the same pixel-bit positions between the two preceding and succeeding image frames as a calculated value;

if the calculated value is greater than or equal to a first preset threshold, storing all the pixel values of the preceding image frame in accordance with their original pixel-bit position information, and recording and storing a time when such processing takes place in image frame sequence;

if the calculated value is less than the first preset threshold, comparing a preceding pixel value in the preceding image frame with a succeeding pixel value positioned in the same pixel-bit position in the succeeding image frame in the image sequence, and recording a number of times of consecutively repeated presence of the preceding pixel value in the pixel-bit position, wherein the comparing and recording comprise:

(a) if an absolute value of the difference between the preceding pixel value and the succeeding pixel value equals is less than a second preset threshold, recording and storing a number of times of consecutively repeated presence of the preceding pixel value in the pixel-bit position in the image sequence, wherein when there is a subsequent image frame to be processed within the image sequence, the preceding pixel value remains as a preceding pixel value to be used to iteratively compare with a new succeeding pixel value corresponding to a pixel value of the same pixel-bit position of a subsequent image frame immediately following the succeeding image frame;

(b) if the absolute value of the difference between the preceding pixel value and the succeeding pixel value is greater than the second preset threshold, recording and storing a number of times of consecutively repeated presence of the preceding pixel value in the pixel-bit sequence in the image sequence;

(c) otherwise recording and storing a number of times of consecutively repeated presence of the succeeding pixel value in the pixel-bit position in the image sequence, wherein when there is a subsequent image frame to be processed within the image sequence, the succeeding pixel value is set as a new preceding pixel value to iteratively compare with a new succeeding pixel value that is a pixel value of the same pixel-bit position of a subsequent image frame adjacent to the succeeding image frame.

7. The method of claim 6, wherein the comparing and recording further comprises:

comparing the preceding image frame with another image frame that is adjacent and previous to the preceding image frame, while comparing the preceding image frame with its succeeding image frame;

recording and storing all the preceding pixel values in the preceding image frame; and recording and storing a number of times of consecutively repeated presence of the preceding pixel value in the pixel-bit position in the image sequence, if the calculated value, which is the sum of the number of different pixel values between the corresponding preceding pixel values and the succeeding pixel values of each pixel-bit position included in the preceding image frame and the image frame adjacent and previous to the preceding image frame, is less than the first preset threshold, and if the calculated value, which is the sum of the number of different pixel values between the corresponding preceding pixel values and the succeeding pixel values of each pixel-bit position included in the preceding image frame and the succeeding image frame, equals to or is greater than the first preset threshold.

8. The method of claim 6, further comprising:

storing all the pixel values of a nth image frame in accordance with their original pixel-bit position information; and recording and storing a time when such processing takes place in the image frame sequence, when the preceding image frame is of a (n−1)th image frame and the calculated value, which is the sum of the number of different pixel values between the corresponding preceding pixel values and the succeeding pixel values of each pixel-bit position included in the two preceding and succeeding image frames, equals to or is greater than the first preset threshold.

9. The method of claim 6, further comprising:

recording and storing all succeeding pixel values of a nth image frame; and recording and storing a number of times of consecutively repeated presence of the succeeding pixel value in the pixel-bit position in the image sequence, when the preceding image frame is of the (n−1)th image frame, and the calculated value, which is the sum of the number of different pixel values between the corresponding preceding pixel values and the succeeding pixel values of each pixel-bit position included in the two preceding and succeeding image frames, is less than the first preset threshold.

10. The method of claim 6, further comprising storing a previous adjacent image frame of the preceding image frame by way of an entire image frame at a rear end of the image sequence in the same storage space, when the preceding image frame needs to be stored by way of an entire image frame.

11. The method of claim 6, further comprising storing a previous adjacent image frame of the preceding image frame by way of an entire image frame in the storage space different from where the image sequence is stored, when the preceding image frame needs to be stored by way of an entire image frame.

12. The method of claim 6, wherein either step (a) or step (b) is selected to process a preceding pixel value and a succeeding pixel value, if the absolute value of the difference between the preceding pixel value and the succeeding pixel value equals to the second preset threshold.

13. A method for compressing and storing an image sequence, comprising:
   forming a pixel-bit sequence according to known positions and order of each pixel in each of image frames of the image sequence;
   marking a pixel value of each pixel-bit position of a preceding image frame as a preceding pixel value;
   marking a pixel value of a corresponding pixel-bit position of a succeeding image frame adjacent to the preceding image frame as a succeeding pixel value;
   comparing the preceding pixel value with the succeeding pixel value of each pixel between the preceding image frame and the succeeding image frame;
   recording a number of times of consecutively repeated presence of the preceding pixel value in the pixel-bit position, including counting a number of times or a ratio of different pixel values in the same pixel-bit position between the preceding frame image and the adjacent succeeding frame image, wherein the comparing and recording comprise:
   (a) if an absolute value of the difference between a preceding pixel value and a succeeding pixel value equals is less than a first preset threshold,
      treating the preceding pixel value equal to the succeeding pixel value,
      recording the preceding pixel value, and
      recording and storing a number of times of consecutively repeated presence of the preceding pixel value in the pixel-bit position in the image sequence, wherein when there is a subsequent image frame to be processed within the image sequence, the preceding pixel value remains as a preceding pixel value to continuously compare iteratively with a new succeeding pixel value that is the pixel value of the same pixel-bit position of a subsequent image frame adjacent to the "succeeding image frame;
   (b) if the absolute value of the difference between the preceding pixel value and the succeeding pixel value is greater than the first preset threshold,
      recording and storing the preceding pixel value, and
      recording and storing a number of times of consecutively repeated presence of the preceding pixel value in the pixel-bit position in the image sequence;
   (c) otherwise recording and storing the succeeding pixel value, and recording and storing a number of times of consecutively repeated presence of the succeeding pixel value in the pixel-bit position in the image sequence;
   counting and updating the number of times or the ratio of the occurrence where the preceding pixel value is not equal to the succeeding pixel value, ever since processing the preceding image frame and the succeeding image frame; and
   if the number of times or the ratio is greater than or equal to a second preset threshold, storing all the pixel values of the preceding image frame in accordance with their original pixel-bit position information, and recording and storing the moment when such processing takes place and image frame sequence, wherein when there is a subsequent image frame to be processed within the image sequence, the succeeding pixel value is set as a new preceding pixel value to repeatedly compare with a new succeeding pixel value that is a pixel value of the same pixel-bit position of a subsequent image frame adjacent to the succeeding image frame.

14. The method of claim 13, wherein either step (a) or step (b) is selected to process a preceding pixel value and a succeeding pixel value, if the absolute value of the difference between the preceding pixel value and the succeeding pixel value, after comparing, equals to the second preset threshold.

* * * * *